(No Model.)
C. W. ISBELL.
HOT GAS SCRUBBER.
No. 249,528. Patented Nov. 15, 1881.
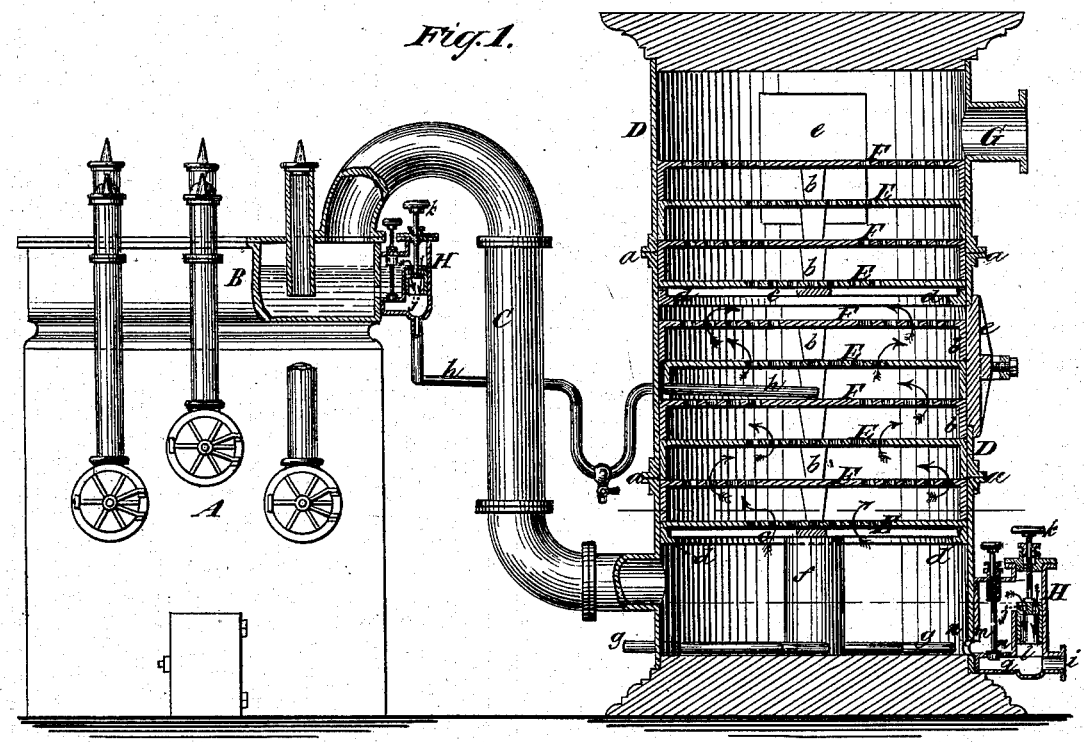
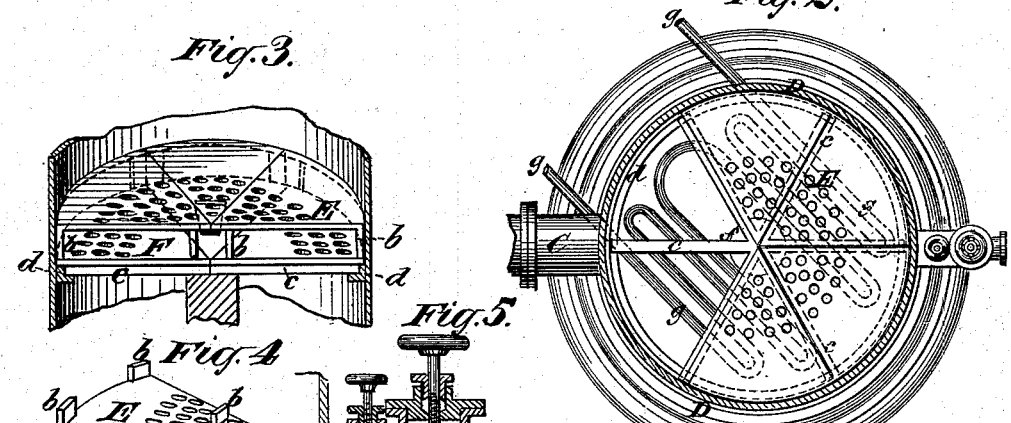
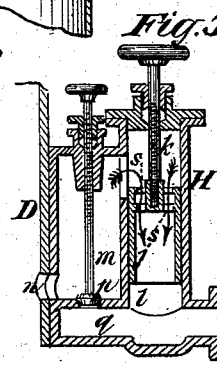
Witnesses
John Becker
E. P. Jessup.
Inventor
C. W. Isbell,
by his Attys,
Brown & Brown

UNITED STATES PATENT OFFICE.

CHARLES W. ISBELL, OF NEW YORK, N. Y.

HOT-GAS SCRUBBER.

SPECIFICATION forming part of Letters Patent No. 249,528, dated November 15, 1881.

Application filed March 13, 1880. (No model.)

*To all whom it may concern:*

Be it known that I, CHARLES W. ISBELL, of the city, county, and State of New York, have invented certain Improvements in Hot-Gas Scrubbers, of which the following is a specification.

My invention relates to a hot scrubber in which the gas obtained from coal or other material by destructive distillation in ordinary or suitable retorts is not only freed from any tar which passes over accidentally or unavoidably from the hydraulic main of the retorts, but the volatile hydrocarbons contained in such tar, and also in a quantity of tar which may be purposely introduced into such scrubber from the hydraulic main, are vaporized and caused to be incorporated into the gas for the purpose of enriching the same. Such a scrubber is described in my Letters Patent No. 214,042, dated April 8, 1879, and in my Letters Patent No. 221,565, dated November 11, 1879.

The invention consists in the combination, in a hot scrubber provided with an inlet-pipe for gas at or near the bottom and an outlet-pipe for gas at or near the top, of a tar-pipe for the introduction of tar, perforated plates arranged one above another and both above and below said tar-pipe, and a steam-pipe for heating the tar which collects at the bottom of the scrubber, whereby provision is afforded for passing the gas first through perforated plates in contact with tar, and afterward through the perforated plates which are free from tar. The heated gas, in passing through the perforated plates below the tar-pipe, vaporizes the volatile hydrocarbon in the tar, and such vaporized hydrocarbon, in passing through the perforated plates above the tar-pipe and by the heat of the gas, is converted into a permanent gas.

Figure 1 in the drawings exhibits an elevation, partly in section, of a bench of gas-retorts and their hydraulic main and a vertical section of a scrubber constructed according to my invention. Fig. 2 is a horizontal section of the scrubber. Fig. 3 is a perspective view of a portion of the interior of the scrubber. Fig. 4 is a perspective view of one of the plates of the scrubber in an inverted position. Fig. 5 is an enlarged vertical sectional view of a sealing device which I employ, and Fig. 6 is a horizontal section of the same.

A is the retort-bench. B is the hydraulic main. C is the pipe by which the gas passes from the hydraulic main to the scrubber, which consists, mainly, of a tower, D, of circular or other form, of any height, of cast or wrought iron, containing a series of perforated horizontal plates, E F, which may be of cast-iron.

The tower D may be built up in sections with joints, as shown at *a a* in Fig. 1, to any desired height, and it may be here remarked that in practice it would be much higher in proportion to its diameter than is represented in Fig. 1, and with a much greater number of plates E F, the number of which represented is, however, sufficient for the purpose of illustration. The plates E F are closely fitted to the tower D, around the interior thereof, and are so constructed with numerous perforations as to present their perforations at and near the center and at and near their circumference or edges alternately—that is to say, plates E E, having the perforations at and near the center, but imperforated near their circumference, alternate with or have interposed between them plates F F, which are imperforate at and near the center, but have perforations in their outer portions and near their circumference. For convenience of insertion and removal these plates are composed of sections of sector shape, as shown in Figs. 2, 3, and 4, with feet *b b*, by which they may be supported one upon another, with proper spaces between them, the said plates, or certain of them, at suitable intervals, being supported by spider-like frames *c c*, which rest on flanges *d d* inside of the tower. This construction of the plates in sections provides for their easy insertion, removal, and replacement through suitable man-holes, *e e*, in the sides of the tower. A center post, *f*, may also be provided at the bottom of the tower to form a central support for the several plates.

The pipe C communicates with the scrubber below the plates E F, and the outlet G for the gas is near the top thereof, above the said plates.

Close to or near the bottom of the scrubber, below the plates E F, is a steam-pipe, *g*, arranged in coil or other suitable form to present a large surface, and receiving steam from a suitable boiler, for the purpose of heating the tar and other liquid matters collected at the bottom of the scrubber.

At a suitable distance above the bottom of the scrubber there is introduced a small pipe, $h$, which is connected with the hydraulic main for the conveyance therefrom into the scrubber of a quantity of tar and ammoniacal liquor, which is intended to be vaporized in the scrubber for the purpose of enriching the gas passing through the latter.

The operation of the scrubber is as follows: The hot gas introduced by the pipe C circulates upward within the scrubber, passing through the perforations of the several plates E F, and, by reason of the arrangement of the said perforations near the centers and near the circumferences of the said plates alternately, being caused to pass over almost the entire surface of each of said plates, so that it may deposit thereon any such tarry matter as may have come over with it from the hydraulic main, and as may be condensable in the scrubber. At the same time the tar which is delivered to the scrubber by the pipe $h$ is distributed over the several plates, E F, below the said pipe and caused to run downward through the perforations therein, so that it is exposed in a very diffused state on the surfaces of the said plates and in the perforations thereof to the hot gas which is passing upward through and between said plates, and the heat of which causes it to vaporize and take up a quantity of the benzoline and other light hydrocarbons from the tar. The tar and ammoniacal liquor which escapes downward through the plates to the bottom of the scrubber, and which collects therein to a certain depth, is heated by the steam-pipe $g$ to such a degree that some of the lighter hydrocarbons contained in it will be vaporized, and some of the water of the ammoniacal liquor will be converted into steam, and the steam and vapor thus eliminated will pass upward with the gas through the plates E F of the scrubber, which become highly heated. The hot gas, the steam, and the light vapors from the tar will all circulate together through and over the heated plates in the part of the scrubber above the pipe $h$, and much of the steam will be condensed and the vapor will be taken up and incorporated into the permanent gas by absorption into or combination with the gas from the retorts, while the inconvertible portion of the tar descends to and is collected at the bottom of the scrubber, whence it escapes by a waste-outlet, $n$.

The use of such a scrubber enables the distillation of coal in retorts to be profitably continued beyond the point at which in ordinary gas apparatus it ceases to be profitable, or until the gas which comes over consists mainly of hydrogen, which is not light-giving, but serves as a vehicle or diluent for the volatile hydrocarbons which are evolved in the scrubber and taken up by such gas.

The sealing device by which the escape of gas at the waste-outlet $n$ of the scrubber is prevented is shown in Fig. 1, but is better shown on a larger scale in Fig. 5. It consists of a box, H, in which is a seat, $l$, of upright cylindrical or other tubular form containing a hollow gate-valve, $j$, of corresponding form, which is worked by a screw, $k$, passing through a stuffing-box in the top of the box H. This gate has openings $s\ s$ in the head or top, and is also open at the bottom. At one side of the seat $l$ there is within the said box H an open space, $m$, at the bottom of which there is communication with the waste-outlet of the scrubber, and which is close to the bottom of the latter. At the bottom of the space $m$ there is a partition containing the seat for a valve, $p$, which is worked by a screw passing through a stuffing-box at the top of the box H, and below this partition is a passage, $q$, communicating with the bottom of the gate-seat $l$ of the gate $j$, and with an outlet, $i$, to which may be connected a waste-pipe.

When the scrubber is in operation the valve $p$ is closed, and the gate $j$ is adjusted by the screw $k$, so that the top of the said gate is just at the level to which it is desired to keep the tar and other liquid which keeps accumulating in the bottom of the scrubber. The tar passing through $n$ then rises into the space $m$ up to a level with the top of the valve, forming a seal in the said space to prevent the escape of gas, and overflows through the openings $s\ s$ in the top of the gate to the outlet-pipe. The valve $p$ is only opened when necessary from time to time to draw off the matter from the bottom of the scrubber when it becomes so thick that it will not flow freely enough through the seal and over the gate $j$. The opening of the valve $p$ allows the thick matter to run downward from the opening $n$ to the passage $q$, and thence directly to the pipe $i$.

A sealing device similar to that above described is represented applied at the connection of the tar-pipe $h$ with the hydraulic main, its object being to regulate the level of the liquid in the hydraulic main and its outflow therefrom through the said pipe, and at the same time prevent the escape of gas.

The sealing device which I employ forms no part of the present invention, but may be made the subject of another application for Letters Patent.

I claim—

The combination, in a hot scrubber provided with an inlet-pipe for gas at or near its bottom and an outlet-pipe for gas at or near its top, of a tar-pipe for the introduction of tar into the scrubber, perforated plates arranged one above another, both above and below said tar-pipe, and a steam-pipe for heating the tar which collects in the bottom of the scrubber, whereby provision is afforded for passing the gas first through perforated plates in contact with tar, and afterward through perforated plates which are free from tar, substantially as specified.

CHAS. W. ISBELL.

Witnesses:
FREDK. HAYNES,
T. J. KEANE.